Jan. 16, 1934.  E. C. SWANSON  1,943,638
MICROMETER GAUGE
Filed July 22, 1929
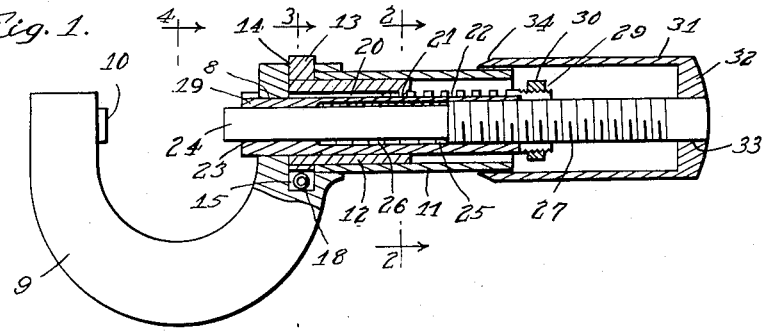
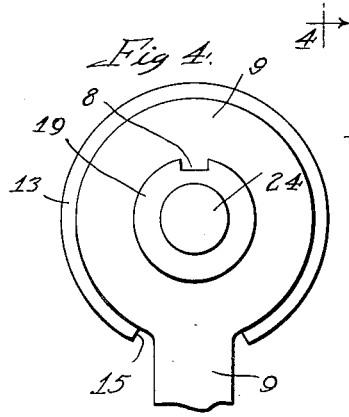 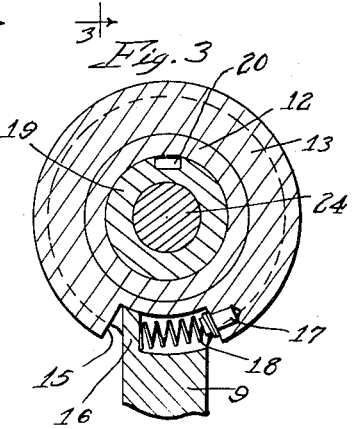 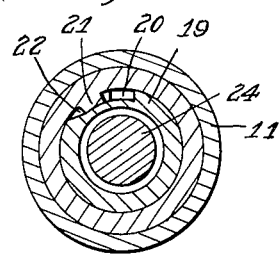
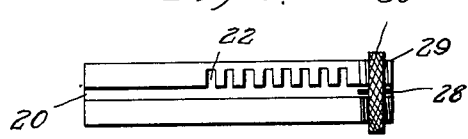
Inventor:
Edwin C. Swanson
By Wilson & McCanna
Attys.

Patented Jan. 16, 1934

1,943,638

UNITED STATES PATENT OFFICE 1,943,638

MICROMETER GAUGE

Edwin C. Swanson, Rockford, Ill.

Application July 22, 1929. Serial No. 380,114

2 Claims. (Cl. 33—165)

My invention relates to micrometer screw calipers of the type adapted for making fine and delicate measurements and is particularly concerned with the type permitting rapid movement of the spindle for rough adjustments.

The usual type of screw caliper is provided with very fine threads requiring many turns of the spindle to advance it through a short distance. While this type of instrument proves satisfactory where measurements of the same degree are concerned, when objects are to be measured which vary considerably in their size much time is consumed and the threads thereof are apt to be badly worn in advancing and retracting the spindle.

I have therefore, aimed to provide a screw caliper in which the spindle may be rapidly advanced and retracted without the operation of the fine threads as is required in the usual type.

I have also aimed to provide a device of this character in which the means employed for accomplishing the desired results are exceedingly simple in construction and operation.

Another object of my invention is the provision of a device of this character which may be manufactured at a cost small in comparison to that required for other devices of the same character.

A further object of my invention is the provision of a caliper of this type having a plurality of adjustments which may be rapidly made, the space between these adjustments being covered by the usual fine screw threads.

Other objects and advantages will become apparent to those skilled in the art from the following description and the accompanying drawing in which—

Figure 1 is an elevation of a preferred form of the caliper shown partly in section;

Fig. 2 is a section on the line 2—2 of Fig. 1; showing the sleeve locking mechanism;

Fig. 3 is a section on the line 3—3 of Fig. 1;

Fig. 4 is a section on the line 4—4 of Fig. 1;

Fig. 5 is an elevation of the sleeve of the caliper.

Referring more particularly to Fig. 1 the caliper consists of the usual yoke 9 having an anvil 10 attached to one end thereof and a cylindrical spindle support 11 attached at the other end. This cylindrical member may, of course, be either formed integral with the yoke or fixedly attached thereto by suitable means. A cylindrical locking collar 12 is positioned within the support 11 and has bearing on the inner surface thereof. A knurled head 13 is attached to the inner end of the collar 12 by frictional or other suitable means whereby the collar 12 may be rotated slightly by grasping the head 13. The knurled nut 13 passes through a transverse slot 14 in the end of the yoke 9 and is provided on its lower side with a recess 15 into which a thin portion 16 of the yoke 9 projects. A pin 17 is positioned in one edge of the recess 15 to maintain a spring 18 which acts between the portion 16 and the edge of the slot 15 to maintain the collar in position. A sleeve 19 shown in Fig. 5, is slidably positioned within the locking collar 12 and has a slidable bearing against the inner wall of the collar 12 and the yoke 9. The sleeve 19 is provided upon its upper surface with a rectangular longitudinal groove 20 arranged to cooperate with a projection 8 upon the yoke 9 to hold the sleeve from rotation. A plurality of grooves 22 are positioned in the sleeve at right angles to and joining the groove 20 and are of such size as to receive a projection 21 located on the inner surface of the locking collar 12. The inner side of the sleeve 19 is provided with portions of two different radii, a portion 23 serving as a bearing for the smooth end 24 of the spindle, and a portion 25 of greater radius having suitable threads 26 positioned thereon to engage the threaded portion 27 of the spindle. The outer end of the sleeve is slotted at 28 and provided with threads 29 engageable with threads on a knurled nut 30 to permit adjustment of the sleeve about the threaded portion 27 of the spindle. A barrel 31 having a closed end 32 is positioned upon the outer end of the spindle through an opening 33 into which the end of the spindle is frictionally pressed. The inner end of the barrel, having conical sides 34, is adapted to pass over the outer surface of the cylindrical support 11 and is concentric therewith. Graduations are provided upon the outer surface of the cylindrical support 11 and the conical sides 34 of the barrel in the usual manner, to cooperate in indicating the position of the spindle.

The operation of the caliper will be seen to be very simple. The knurled head 13 is turned against the tension of the spring 18 until the projection 21 on the collar 12 rests in the groove 20. The barrel 31 may then be moved back and forth and the smooth end 24 of the spindle be thus projected or retracted to the desired position. The head 13 is then released permitting the projection 21 to move into one of the grooves 22 adjacent thereto. The fine adjustment of the spindle is then made by rotating the barrel 31 in the manner usually employed with calipers of this character. The great amount of time usually required in moving the spindle from an extreme retracted position to an extreme projected position or vice versa is thus materially shortened.

It will be plain that in a construction of this character the slidable connection between the cylindrical support 11 and the spindle may be placed either on the interior or exterior surface of the sleeve 19. While this will necessitate a slight difference or change in the construction of the locking mechanism the principle employed is essentially the same.

It will be evident to those skilled in the art that I have provided a caliper which may be economically manufactured, is rapid in use, and accurate in its measurements. The device employs the usual construction of screw calipers with the exception of certain improved features which render it much more useful than the usual type.

While I have thus described and illustrated a particular embodiment of my invention I realize that numerous alterations and changes may be made therein without materially departing from the principles of the invention and I do not wish to be limited except as required by the prior art and the scope of the appended claims in which I claim:

1. A caliper of the character described having a yoke, an anvil attached to one end of said yoke, a cylindrical support attached to the opposite end of said yoke, a sleeve positioned in said support for slidable endwise movement, adapted to support a spindle in rapid movement toward and away from said anvil, said sleeve being provided with a longitudinal groove and a plurality of transverse grooves intersecting therewith, and manually operable means having a portion thereof adapted to rest in said longitudinal groove to permit endwise movement of said sleeve and to selectively engage said transverse grooves to prevent such movement, in either direction.

2. A caliper as set forth in claim 1 wherein said manually operable means comprises a member positioned in the end of the yoke opposite said anvil adapted to be manually rotated in one direction, a spring arranged to rotate said member in the opposite direction, and a collar secured to said member and positioned around said sleeve and having a projection adapted to engage said transverse grooves, under the action of said spring and be manually moved to said longitudinal groove.

EDWIN C. SWANSON.